(12) United States Patent
Trautman et al.

(10) Patent No.: US 10,901,425 B2
(45) Date of Patent: Jan. 26, 2021

(54) SYSTEMS AND METHODS FOR NAVIGATIONAL PLANNING

(71) Applicant: Honda Motor Co., Ltd., Tokyo (JP)

(72) Inventors: Peter Trautman, Mountain View, CA (US); Soshi Iba, Mountain View, CA (US); Shih-Yun Lo, Austin, TX (US); Katsu Yamane, Sunnyvale, CA (US); Chao Cao, Pittsburgh, PA (US)

(73) Assignee: Honda Motor Co., Ltd., Tokyo (JP)

( * ) Notice: Subject to any disclaimer, the term of this patent is extended or adjusted under 35 U.S.C. 154(b) by 11 days.

(21) Appl. No.: 16/205,572

(22) Filed: Nov. 30, 2018

(65) Prior Publication Data
US 2020/0174480 A1    Jun. 4, 2020

(51) Int. Cl.
*G05D 1/02* (2020.01)
*G01C 21/36* (2006.01)
(Continued)

(52) U.S. Cl.
CPC ....... *G05D 1/0214* (2013.01); *G01C 21/3605* (2013.01); *G06T 3/0037* (2013.01); *H04W 4/40* (2018.02); *G05D 2201/0213* (2013.01)

(58) Field of Classification Search
CPC .......... G05D 1/0214; G05D 2201/0213; G06T 3/0037; H04W 4/40; G01C 21/3605; G05B 2219/40475; G05B 2219/40476; G05B 2219/40477; G05B 2219/40455; G05B 2219/40507; G05B 2219/40339;
(Continued)

(56) References Cited

U.S. PATENT DOCUMENTS 7,030,875 B2    4/2006  Gupta et al.
9,199,668 B2   12/2015  Zeng et al.
9,868,443 B2    1/2018  Zeng et al.

FOREIGN PATENT DOCUMENTS

CN    101266694    6/2010
CN    105652876    6/2016
(Continued)

OTHER PUBLICATIONS

B. Banerjee and B. Chandrasekaran, "A framework of Voronoi diagram for planning multiple paths in free space," Journal of Experimental & Theoretical Artificial Intelligence, 2012, 1-19, iFirst.

(Continued)

*Primary Examiner* — Nishant Divecha
(74) *Attorney, Agent, or Firm* — Rankin, Hill & Clark LLP

(57) ABSTRACT

Embodiments, systems, and methods for navigational planning of a mobile programmable agent are provided. In some embodiments, the navigational planning may include identifying a plurality of dynamic objects in a physical environment having an origin and a destination. The physical environment is divided into a plurality of plane figures. The location of a centroid of each plane figure can then be calculated. A network of segments is formed from the origin to the destination intersecting the centroids. At least one channel is determined from the origin to the destination using a set of segments. A set of gates is identified along the at least one channel. The state of the gates is selectively determined based on movement of the dynamic objects. A pathway can then be identified within the channel for the mobile programmable agent to traverse from the origin to the destination based on the state of the gates.

20 Claims, 6 Drawing Sheets

(51) Int. Cl.
  *H04W 4/40* (2018.01)
  *G06T 3/00* (2006.01)
(58) Field of Classification Search
  CPC ........... G05B 2219/39082; G05B 2219/39091;
       G05B 2219/40201; G05B 2219/40202;
       G05B 2219/40365; G05B 2219/49143;
       G05B 2219/40523; G05B 2219/40512;
       G05B 2219/37447; G05B 2219/40518;
       G05B 2219/40519; G05B 2219/33048
  See application file for complete search history.

(56) References Cited

FOREIGN PATENT DOCUMENTS

| | | |
|---|---|---|
| CN | 106406338 | 2/2017 |
| CN | 104679004 | 7/2017 |
| CN | 107272680 | 10/2017 |
| CN | 108415417 | 8/2018 |
| DE | 102008050206 | 5/2010 |
| KR | 101286135 | 7/2013 |

OTHER PUBLICATIONS

P. Brož, M. Zemek, I. Kolingerová, and J. Szkandera, "Dynamic Path Planning With Regular Triangulations," Machine Graphics & Visiaion, vol. 23, No. 3/4, 2014, pp. 119-142.
B. Chazelle, "A theorem on polygon cutting with applications," in 23rd Annual Symposium on Foundations of Computer Science (sfcs 1982), 1982.
J. Chen, C. Luo, M. Krishnan, M. Paulik, and Y. Tang, "An enhanced dynamic Delaunay triangulation-based path planning algorithm for autonomous mobile robot navigation," SPIE, vol. 7539, 75390P, 2010.
Y. F. Chen, M. Everett, M. Liu, and J. P. How, "Socially Aware Motion Planning with Deep Reinforcement Learning," in IROS, 2017.
H. Choset and J. Burdick, "Sensor-based exploration: the hierarchical generalized Voronoi graph," International Journal of Robotics Research, vol. 19, No. 2, pp. 96-125, 2000.
D. Connell and H. M. La, "Dynamic Path Planning and Replanning for Mobile Robots using RRT*," 2017. [Online]. Available: http://arxiv.org/abs/1704.04585.
R. C. Coulter, "Implementation of the pure pursuit path tracking algorithm," Carnegie-Mellon Univ Pittsburgh PA Robotics Inst, Tech. Rep., Jan. 1992.
D. Demyen and M. Buro, "Efficient triangulation-based pathfinding," Proceedings of the 21st National Conference on Artificial Intelligence, vol. 6, pp. 942-947, 2007.
P. Fiorini and Z. Shiller, "Motion Planning in Dynamic Environments using Velocity Obstacles," International Journal of Robotics Research, 1998.
D. Fox, W. Burgard, and S. Thrun, "The Dynamic Window Approach to Collision Avoidance," IEEE Robotics and Automation Magazine, 1997.
T. Fraichard and H. Asama, "Inevitable Collision States: a Step Towards Safer Robots?" in ICIRS, 2003.
M. Garber and M. Lin, "Constraint-based motion planning using voronoi diagrams," Algorithmic Foundations of Robotics V, 2004.
P. Henry, C. Vollmer, B. Ferris, and D. Fox, "Learning to Navigate Through Crowded Environments," in ICRA, 2010.
J. Hershberger and J. Snoeyink, "Computing minimum length paths of a given homotopy class," Lecture Notes in Computer Science, 1991.
M. Kallmann, "Path planning in triangulations," International Joint Conference on Artificial Intelligence, pp. 49-54, 2005.
S. Karaman and E. Frazzoli, "Sampling-based algorithms for optimal motion planning," in IJRR, 2011.
L. Kavraki, L. Kavraki, P. Svestka, P. Svestka, J.-C. Latombe, J.-C. Latombe, and M. Overmars, "Probabilistic roadmaps for path planning in high-dimensional configuration spaces," IEEE Transactions on Robotics and Automation, vol. 12, No. 4, Aug. 1996.
L. E. Kavraki, M. N. Kolountzakis, and J.-c. Latombe, "Analysis of Probabilistic Roadmaps for Path Planning," IEEE Transactions on Robotics and automation, vol. 14, No. 1, Feb. 1998.
T. Kruse, R. Alami, A. K. Pandey, and A. Kirsch, "Human-aware robot navigation: a Survey," in RAS, 61, pp. 1726-1743, 2013.
M. Kuderer, C. Sprunk, H. Kretzschmar, and W. Burgard, "Online generation of homotopically distinct navigation paths," IEEE International Conference on Robotics and Automation, 2014.
M. Kuderer, H. Kretzschmar, and W. Burgard, "Teaching Mobile Robots to Cooperatively Navigate in Populated Environments," in IROS, 2013.
J. Kuffner and S. LaValle, "RRT-connect: an efficient approach to single-query path planning," IEEE International Conference on Robotics and Automation., 2000.
B. Lau, C. Sprunk, and W. Burgard, "Kinodynamic motion planning for mobile robots using splines," 2009 IEEE/RSJ International Conference on Intelligent Robots and Systems, pp. 2427-2433, 2009.
D. T. Lee and F. P. Preparata, "Euclidean shortest paths in the presence of rectilinear barriers," Networks, vol. 14, No. 3, pp. 393-410, 1984.
A. Lerner, Y. Chrysanthou, and D. Lischinski, "Crowds by example," Computer Graphics Forum, vol. 26, No. 3, pp. 655-664, 2007.
M. Luber, L. Spinello, J. Silva, and K. O. Arras, "Socially-Aware Robot Navigation: a Learning Approach," in IROS, 2012.
C. I. Mavrogiannis, V. Blukis, and R. A. Knepper, "Socially Competent Navigation Planning by Deep Learning of Multi-Agent Path Topologies," in IROS, 2017.
J. Müller, C. Stachniss, K. O. Arras, and W. Burgard, "Socially Inspired Motion Planning for Mobile Robots in Populated Environments," Computer, 2008.
S. Pellegrini, A. Ess, K. Schindler, and L. Van Gool, "You'll never walk alone: modeling social behavior for multi-target tracking," in International Conference on Computer Vision, 2009.
S. Quinlan and O. Khatib, "Elastic bands: connecting path planning and control," [1993] Proceedings IEEE International Conference on Robotics and Automation, pp. 802-807, 1993.
C. Rösmann, W. Feiten, T. Wösch, F. Hoffmann, and T. Bertram, "Efficient trajectory optimization using a sparse model," 2013 European Conference on Mobile Robots, 2013.
J. Snape, J. van den Berg, S. Guy, and D. Manocha, "The hybrid reciprocal velocity obstacle," IEEE Transactions on Robotics, vol. 27, No. 4, Aug. 2011.
M. Svenstrup, T. Bak, and J. Andersen, "Trajectory Planning for Robots in Dynamic Human Environments," in IROS, 2010.
P. Trautman and A. Krause, "Unfreezing the robot: Navigation in dense, interacting crowds," IEEE International Conference on Intelligent Robots and Systems, 2010.
J. van den Berg, S. Guy, M. Lin, and D. Manocha, "Reciprocal n-body Collision Avoidance," in ISRR, 2009.
J. Van Den Berg, S. J. Guy, M. Lin, and D. Manocha, "Optimal Reciprocal Collision Avoidance for Multi-Agent Navigation," p. 8, 2010.
J. Van Den Berg, J. Snape, S. J. Guy, and D. Manocha, "Reciprocal collision avoidance with acceleration-velocity obstacles," IEEE International Conference on Robotics and Automation, 2011.
Jur P. van den Berg and Mark H. Overmars, "Roadmap-Based Motion Planning in Dynamic Environments," IEEE Transactions on Robotics, vol. 12, No. 5, Oct. 2005.
Van Den Berg and M. Overmars, "Kinodynamic motion planning on roadmaps in dynamic environments," IEEE International Conference on Intelligent Robots and Systems, 2007.
Van den Berg, Jur, Ming Lin, and Dinesh Manocha. "Reciprocal velocity obstacles for real-time multi-agent navigation." Robotics and Automation, 2008.
D. Wilkie, J. Van Den Berg, and D. Manocha, "Generalized velocity obstacles," 2009 IEEE/RSJ International Conference on Intelligent Robots and Systems, IROS 2009, No. Jun. 2014, pp. 5573-5578, 2009.

(56) References Cited

OTHER PUBLICATIONS

H. Yan, H. Wang, Y. Chen, and G. Dai, "Path planning based on Constrained Delaunay Triangulation," Intelligent Control and Automation, 2008. WCICA 2008. 7th World Congress on, pp. 5168-5173, 2008.

M. Zucker, J. Kuffner, and M. Branicky, "Multipartite RRTs for rapid replanning in dynamic environments," IEEE International Conference on Robotics and Automation, 2007.

SYSTEMS AND METHODS FOR NAVIGATIONAL PLANNING

BACKGROUND

Navigating through crowded human environments is a cornerstone functionality for many mobile programmable agent applications (e.g., service, safety, and logistic robotics). However, crowd navigation requires safe operation of the mobile programmable agent in close proximity to agile pedestrians: a competent crowd planner needs to efficiently generate feasible, optimal, and even socially compliant trajectories. Most existing approaches focus on either global or local optimality. For instance, sampling based motion planners often assume a static environment because adding a time dimension exponentially increases the amount of time and resources required for computation. Search-based, optimization-based and geometry-based planning are subject to the same computational shortcoming. Alternatively, local planners attend to agent dynamics by seeking collision-free paths over short time horizons but neglect global optimality.

BRIEF DESCRIPTION

According to one or more aspects, a system for navigational planning of a mobile programmable agent at an origin is provided. In one embodiment, the system includes a processing unit and a memory for storing processor-executable instructions. When executed by the processing unit the instructions cause a destination to be identified for the mobile programmable agent. A plurality of dynamic objects are identified in a physical environment including the origin and the destination. A dynamic object is capable of self-propelled movement. The instructions also cause a geometric operation to be performed to divide the physical environment into a plurality of plane figures. Each plane figure has an outline and an area. Each of the plane figures also includes at least three angles corresponding to one or more of the origin, the destination, and a dynamic object of the plurality of dynamic objects. The instructions also cause a location of a centroid in the area of each plane figure to be calculated. The instructions further cause a network of segments to be formed from the origin to the destination intersecting the centroids. At least one channel is determined from the origin to the destination using a set of segments from the network of segments. The instructions cause a set of gates to be identified along the at least one channel. A gate extends from one dynamic object to another dynamic object along an outline of a plane figure that connects the one dynamic object to the other dynamic object. The instructions also cause a state of the gates to be selectively determined based on movement of one or more of the dynamic objects. The state is selected from static, opening, closing, or closed. The instructions further cause a pathway to be identified in the channel for the mobile programmable agent to traverse from the origin to the destination based on the determined state of the gates.

According to one or more aspects, a method for navigational planning of a mobile programmable agent at an origin is provided. The method includes identifying a destination for the mobile programmable agent. The method also includes identifying a plurality of dynamic objects in a physical environment including the origin and the destination. A dynamic object is capable of self-propelled movement. The method further includes a geometric operation to be performed to divide the physical environment into a plurality of plane figures. Each plane figure has an outline and an area. Each of the plane figures also includes at least three angles corresponding to one or more of the origin, the destination, and a dynamic object of the plurality of dynamic objects. The method includes calculating a location of a centroid in the area of each plane figure. The method further includes forming a network of segments from the origin to the destination intersecting the centroids. A channel is determined from the origin to the destination using a set of segments from the network of segments. The method further includes identifying a set of gates along the channel. The gates of the set of gates have lengths extending between dynamic objects along an outline of a plane figure that connects dynamic objects. The method also includes selectively determining a state of the gates to be based on movement of one or more of the dynamic objects. The state is selected from static, opening, closing, or closed. The method further includes identifying a pathway for the mobile programmable agent to traverse from the origin to the destination based on the determined state of the gates.

According to one or more aspects, a non-transitory computer-readable storage medium is provided for storing instructions that, when executed by a computer, causes the computer to perform a method for navigational planning. The method includes identifying a destination for the mobile programmable agent. The method also includes identifying a plurality of dynamic objects in a physical environment including the origin and the destination. A dynamic object is capable of self-propelled movement. The method further includes a geometric operation to be performed to divide the physical environment into a plurality of plane figures. Each plane figure has an outline and an area. Each of the plane figures also includes at least three angles corresponding to one or more of the origin, the destination, and a dynamic object of the plurality of dynamic objects. The method includes calculating a location of a centroid in the area of each plane figure. The method further includes forming a network of segments from the origin to the destination intersecting the centroids. A channel is determined from the origin to the destination using a set of segments from the network of segments. The method further includes identifying a set of gates to be identified along the channel. A gate extends from one dynamic object to another dynamic object along an outline of a plane figure that connects the one dynamic object to the other dynamic object. The method also includes selectively determining a state of the gates to be based on movement of one or more of the dynamic objects. The state is selected from static, opening, closing, or closed. The method further includes identifying a pathway in the channel for the mobile programmable agent to traverse from the origin to the destination based on the determined state of the gates.

DETAILED DESCRIPTION

Figure 1:
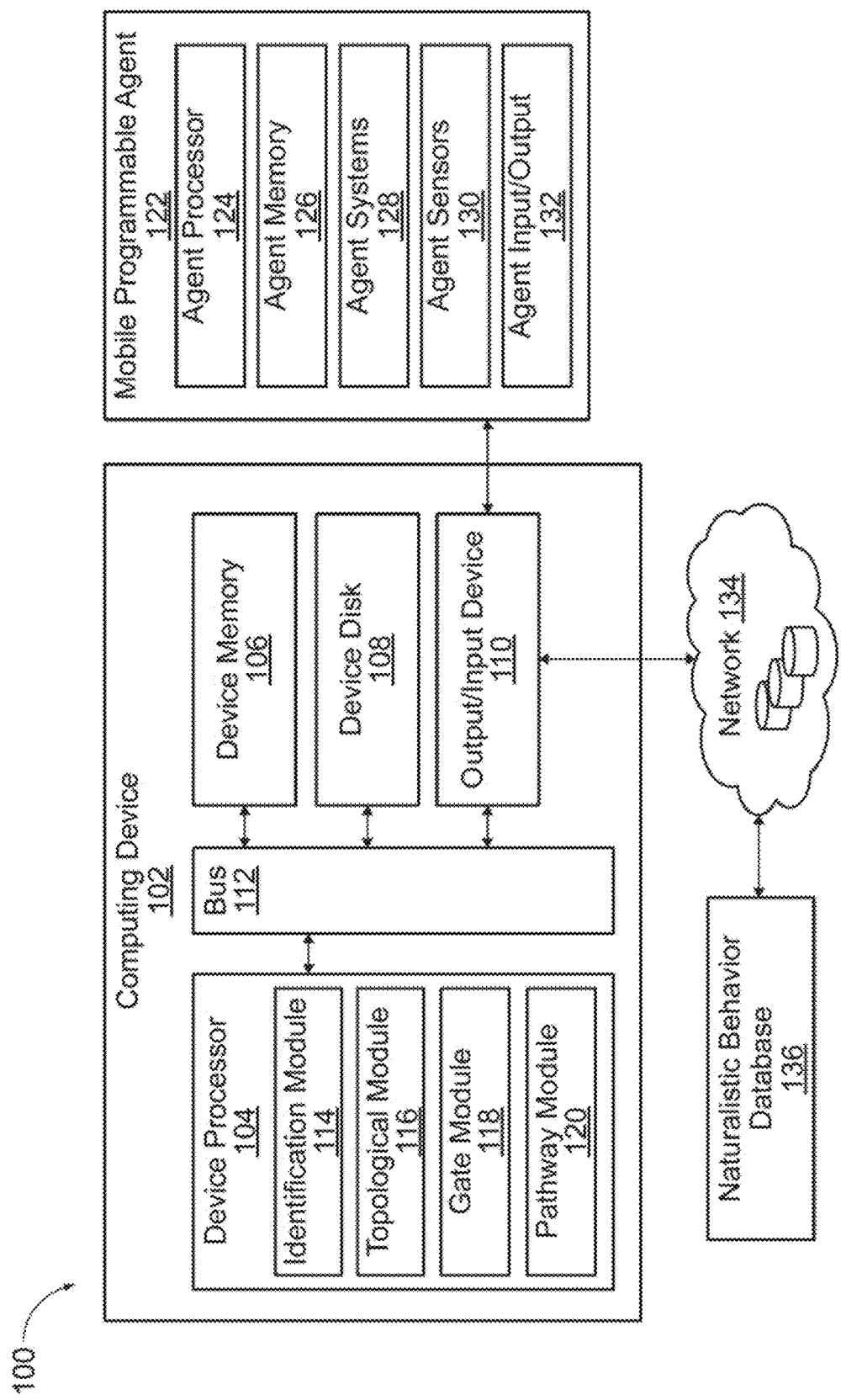
FIG. 1 is a schematic diagram of an operating environment for implementing systems and methods for navigational planning according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Definitions

The following includes definitions of selected terms employed herein. The definitions include various examples and/or forms of components that fall within the scope of a term and that can be used for implementation. The examples are not intended to be limiting.

An "agent system" as used herein can include, but is not limited to, any automatic or manual systems that can be used to enhance a mobile programmable agent, functioning of the mobile programmable agent, and/or the safety of the mobile programmable agent. Exemplary agent systems include, but are not limited to: an electronic stability control system, a brake assist system, a collision warning system, a collision mitigation braking system, a sensor cooperation system, visual devices (e.g., camera systems, proximity sensor systems), a navigation system, a flight control system, an autonomy system, an object recognition system, a learning system, a communication system, a behavioral system, an audio system, and a sensory system, among others.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a mobile programmable agent bus that interconnects components inside a mobile programmable agent using protocols such as Media Oriented Systems Transport (MOST), Controller Area network (CAN), Local Interconnect Network (LIN), among others.

"Computer communication," as used herein, refers to a communication between two or more computing devices (e.g., computer, personal digital assistant, cellular telephone, network device, mobile programmable agent, computing device, infrastructure device, security device) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicle-to-everything (V2X) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

A "disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database," as used herein can refer to table, a set of tables, a set of data stores and/or methods for accessing and/or manipulating those data stores. Some databases can be incorporated with a disk as defined above.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "mobile programmable agent" as used herein, is a physical device that can be programmed to take actions that have effects on the physical world. The mobile programmable agent may also be able to make decisions based on, but not limited to, programmed data, some degree of artificial intelligence, and/or sensor data. The mobile programmable agent may also exhibit complex behavior autonomously or semi-autonomously. Exemplary mobile programmable agents include, but are not limited to: a robot (e.g., a mobile robot, an industrial robot, a service robot, a domestic robot, an educational robot, a modular robot, a collaborative robot, a healthcare robot, military robot, mining robot, etc.) automaton, personal mobility device, autonomous vehicle, humanoid, cyborg, and a drone, among others.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor" or "processing unit," as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

I. System Overview

Referring now to the drawings, the showings are for purposes of illustrating one or more exemplary embodiments and not for purposes of limiting same. FIG. 1 is a schematic diagram of an operating environment 100 for navigational planning. The components of operating environment 100, as well as the components of other systems, hardware architectures, and software architectures discussed herein, can be combined, omitted, or organized into different architectures for various embodiments. Further, the components of the operating environment 100 can be onboard, implemented with, or associated with a mobile programmable agent.

In the illustrated embodiment of FIG. 1, the operating environment 100 includes a computing device 102 with provisions for processing, communicating, and interacting with various components of the mobile programmable agent and other components of the operating environment 100. In one embodiment, the computing device 102 can be implemented with a mobile programmable agent 122, for example, as part of a telematics unit, a head unit, a navigation unit, an electronic control unit, among others. In other embodiments, the components and functions of the computing device 102 can be implemented remotely from the mobile programmable agent 122, for example, with a portable device (not shown) or another device connected via a network (e.g., a network 134).

Generally, the computing device 102 includes a processor 104, a device memory 106, a disk 108, and an input/output (I/O) interface 110, which are each operably connected for computer communication via a bus 112 and/or other wired and wireless technologies. The I/O interface 110 provides software and hardware to facilitate data input and output between the components of the computing device 102 and other components, networks, and data sources, which will be described herein. Additionally, the processor 104 includes an identification module 114, a topological module 116, a gate module 118, and a pathway module 120, for assisting a mobile programmable agent 122 with navigational planning, facilitated by the components of the operating environment 100. The computing device 102 is also operably connected for computer communication (e.g., via the I/O interface 110 and/or the bus 112) to one or more mobile programmable agents, such as the mobile programmable agent 122. In some embodiments, the mobile programmable agent 122 includes an agent processor 124, and agent memory, agent systems 128, agent sensors 130, and an agent input/output 132.

The agent systems 128 include and/or are operably connected for computer communication to the agent sensors 130. The agent sensors 130 provide and/or sense information associated with the mobile programmable agent 122, the physical environment, and/or the agent systems 128. The agent sensors 130 can include, but are not limited to, sensors associated with the agent systems 128 and/or other sensors associated with the mobile programmable agent 122. For example, the agent sensors 130 may be image sensors, cameras, optical sensors, radio sensors, light sensors, light detection and ranging (LiDAR) sensors, radar, laser sensors, pressure sensors, force sensors, thermal sensors, temperature sensors, proximity sensors, and biosensors, among others.

Figure 3:
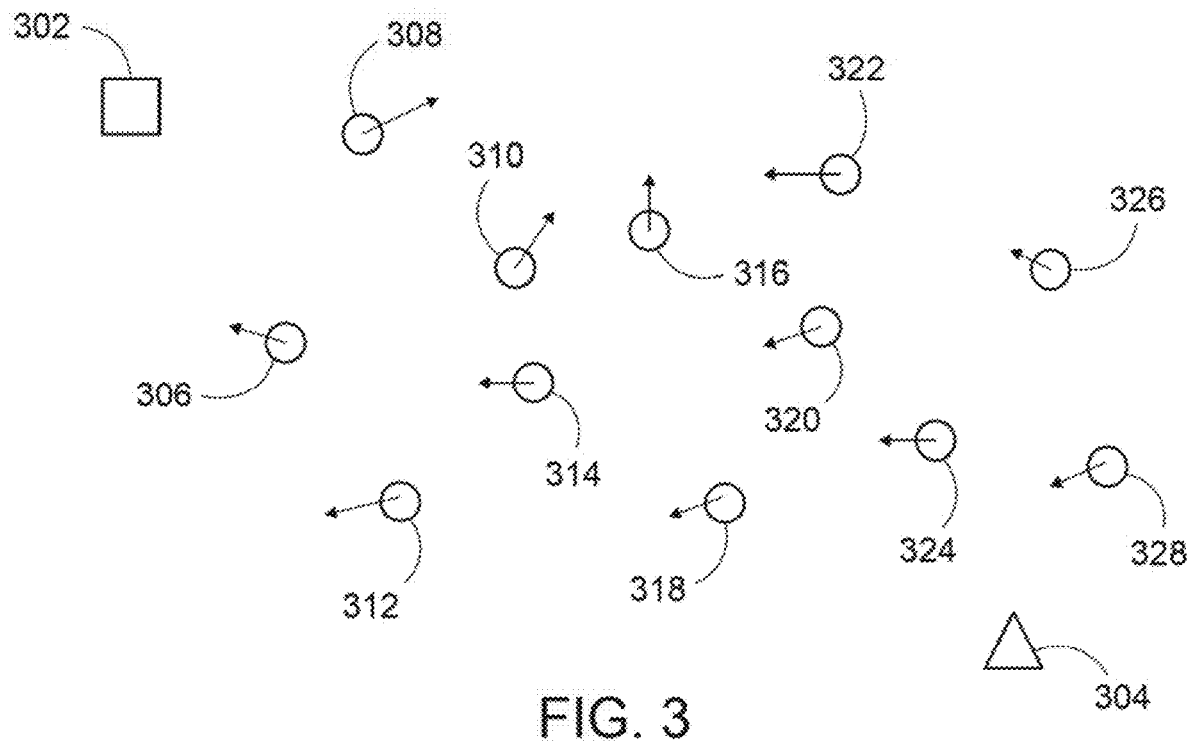
FIG. 3 is a schematic diagram of a physical environment having an origin, a destination, and a plurality of dynamic objects according to one or more embodiments.

The agent sensors 130 can also include sensors external to the mobile programmable agent 122 (accessed, for example, via the network 134), for example, external cameras, radar and laser sensors on other mobile programmable agents, street cameras, surveillance cameras, infrastructure sensors, traffic cameras, in-ground sensors, motion sensors, etc. that collect data regarding the mobile programmable agent 122 as well as the physical environment 300 of the mobile programmable agent 122, shown in FIG. 3, including objects in the physical environment 300. Additionally, the agent sensors 130 may detect characteristics of one or more dynamic objects 306-328 in the physical environment 300, such as location and speed of the dynamic objects 306-328, as well as relative characteristics of the mobile programmable agent 122 and the dynamic objects 306-328, such as relative distance and speed between the mobile programmable agent 122 and the one or more dynamic objects 306-328.

The agent sensors 130 can include, but are not limited to, environmental sensors, vehicle speed sensors, brake sensors, wheel sensors, anti-lock brake sensors, camshaft sensors, among others. In some embodiments, the agent sensors 130 are incorporated with the agent systems 128. For example, suppose the agent systems 128 include a navigation system, one or more agent sensors 130 may be incorporated with the navigation system to monitor characteristics of the mobile programmable agent 122, such as location and speed.

Accordingly, the agent sensors 130 are operable to sense a measurement of data associated with the mobile programmable agent 122, the physical environment, the agent systems 128, and/or objects, such as dynamic objects, in the physical environment 300. The agent sensors 130 are also operable to generate a data signal indicating said measurement of data. These data signals can be converted into other data formats (e.g., numerical) and/or used by the agent systems 128 and/or the computing device 102 to generate other data metrics and parameters.

The computing device 102 is also operatively connected for computer communication to the network 134 and a naturalistic behavior database 136. It is understood that the connection from the I/O interface 110 to the network 134, and the naturalistic behavior database 136 can be facilitated in various ways. For example, through a network connection (e.g., wired or wireless), a cellular data network from a portable device (not shown), among others, or any combination of thereof. In some embodiments, the naturalistic behavior database 136 could be located onboard the mobile programmable agent 122. In other embodiments, the naturalistic behavior database 136 can be distributed in one or more locations.

The network 134 is, for example, a data network, the Internet, a wide area network or a local area network. The network 134 serves as a communication medium to various remote devices (e.g., databases, web servers, remote servers, application servers, intermediary servers, client machines, other portable devices). In some embodiments, the naturalistic behavior database 136 may be included in the network 134, accessed by the computing device 102 through the network 134, and/or the network 134 can access the naturalistic behavior database 136. Thus, in some embodiments, the computing device 102 can obtain data from the naturalistic behavior database 136 via the network 134.

Figure 2:
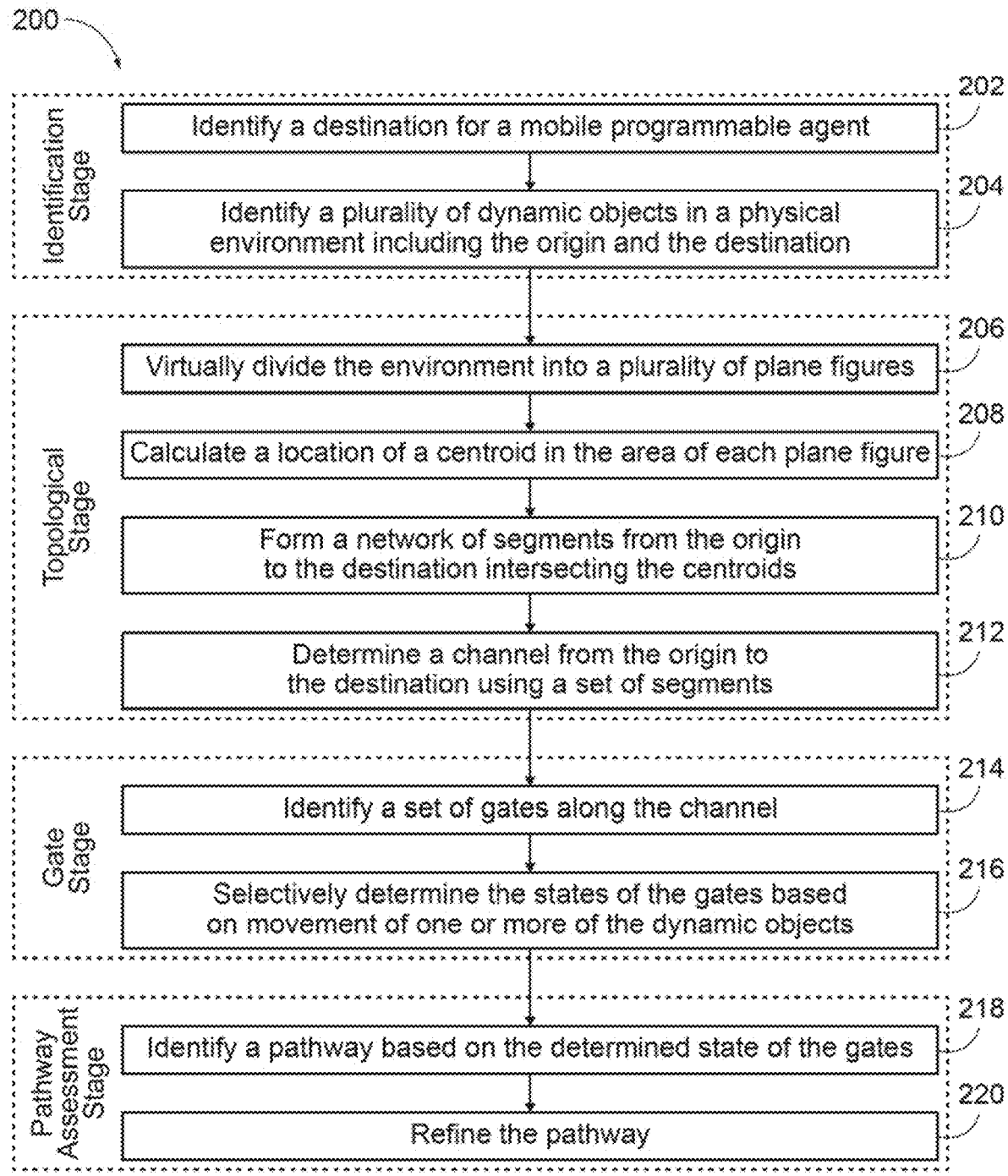
FIG. 2 is an example flow diagram of a method for navigational planning according to one or more embodiments.

The application of systems and methods, such as the method 200 of FIG. 2, are described with respect to the mobile programmable agent 122 planning to navigate a physical environment 300, shown in FIG. 3. The mobile programmable agent 122 may access or host the computing device 102, as described above. Here, the mobile programmable agent 122 is traveling from an origin 302 to a destination 304 through the physical environment 300 having a number of dynamic objects, such as dynamic objects 306-328. The dynamic objects 306-328 are capable of self-propelled movement, and may be in motion as indicated by the arrows associated with the dynamic objects 306-328. For example, the dynamic objects 306-328 may be humans populating the physical environment 300. The arrangement of the dynamic objects 306-328 in the physical environment 300 is an example embodiment of the physical environment 300 and various configurations may be used.

Using the system and network configuration discussed above, a mobile programmable agent 122 can identify a safe route through the physical environment 300 despite the environment changing due to the movement of the dynamic objects 306-328. For example, the mobile programmable agent 122 can avoid collisions with the dynamic objects 306-328. In addition to the route being safer, the route can accommodate social conventions associated with the dynamic objects 306-328. For example, suppose the dynamic objects 306-328 are humans. The route may include parameters that account for personal space so that the mobile programmable agent 122 does not approach a human too closely. Detailed embodiments describing exemplary methods using the system and network configuration discussed above will now be discussed in detail.

II. Methods

Referring now to FIG. 2, a method 200 for navigational planning will be described according to an example embodiment with reference to FIGS. 1 and 3-10.

As shown in FIG. 2, the method 200 for navigational planning for the mobile programmable agent 122 can be described by four stages, namely, (A) identification, (B) topological analysis, (C) gate determination, and (D) pathway assessment. For simplicity, the method 200 will be described by these stages, but it is understood that the elements of the method 200 can be organized into different architectures, blocks, stages, and/or processes.

A. Identification Stage

The identification processes described below are performed by, coordinated by, and/or facilitated by the identification module 114 of the processor 104. The identification module 114 may additionally utilize other components of the operating environment 100, including the mobile programmable agent 122, the agent systems 128, and/or the agent sensors 130.

The mobile programmable agent 122 may be initially located at the origin 302 in the physical environment 300. With respect to FIG. 2, at block 202, the identification stage includes identifying a destination 304 at the identification module 114. The destination 304 may be a set of coordinates, address, heading, direction, etc. The destination 304 may a target location that the mobile programmable agent 122 is attempting to reach, for example, to perform an action. Alternatively, the destination 304 may be a waypoint on the path to the target location. The target location may be received at the identification module 114 but be deemed unreachable. For example, suppose the identification module 114 determines that the target location is outside of the sensor range of the agent sensors 130 of the mobile programmable agent 122. The identification module 114 may then identify the destination 304 as a waypoint to the target location based on the capabilities of the agent sensors 130, proximity to the target location, and/or estimated time of arrival at the destination. In some embodiments, the method 200 is iteratively performed such that waypoints approaching the target location are identified as destinations until the destination 304 is not a waypoint but the target location.

Returning to the method 200, at block 204, the identification stage includes identifying a plurality of dynamic objects 306-328 including a first dynamic object 306, a second dynamic object 308, a third dynamic object 310, a fourth dynamic object 312, a fifth dynamic object 314, a sixth dynamic object 316, a seventh dynamic object 318, an eighth dynamic object 320, a ninth dynamic object 322, a tenth dynamic object 324, an eleventh dynamic object 326, and a twelfth dynamic object 328 in the physical environment 300 having the origin 302 and the destination 304.

The dynamic objects 306-328 may be identified by the identification module 114 based on identification data including, but not limited to, the movement, sounds, actions, and/or life signs, of objects in the physical environment 300. In one embodiment, the identification module 114 may use artificial intelligence systems to distinguish between fixtures (not shown) of the physical environment 300 and the dynamic objects 306-328 based on the identification data received from the agent systems 128 and/or the agent sensors 130 of the mobile programmable agent 122.

As described above, the dynamic objects 306-328 are capable of self-propelled movement, and may be in motion as indicated by the arrows associated with the dynamic objects. In particular, the dynamic objects 306-328 may be in motion, substantially stationary, or motionless. For example, suppose that the dynamic objects 306-328 are humans populating the physical environment 300, and the first dynamic object 306 is walking, the third dynamic object 310 and the sixth dynamic object 316 are in conversation, and the ninth dynamic object 322 is standing still. The identification module 114 may receive identification data from the agent sensors 130, such as identification data from image sensors to determine that the first dynamic object 306 is in motion. Likewise, the identification data may include audio data from a microphone to determine that the third dynamic object 310 and the sixth dynamic object 316 are in conversation even though the third dynamic object 310 and the sixth dynamic object 316 are substantially stationary. Furthermore, the identification data may include biosensor data to identify that the ninth dynamic object 322 is a dynamic object despite the ninth dynamic object 322 being motionless. Accordingly, the identification data may facilitate the identification module 114 distinguishing between fixtures and dynamic objects 306-328, and further determine whether the dynamic objects 306-328 are in motion, substantially stationary, or motionless. Thus, the dynamic objects 306-328 may be identified by one or more of their position, their velocity, the relative distance of the dynamic objects 306-328 with respect to the mobile programmable agent 122, the relative velocity with respect to the mobile programmable agent 122, the relative distance of the dynamic objects 306-328 to the origin 302, and the relative distance of the dynamic objects 306-328 to the destination 304.

Although the dynamic objects 306-328 may be in motion, the identification module 114 may identify the dynamic objects 306-328 based on a particular instance in time such that the relative distance between the origin 302, the destination 304, and the dynamic objects 306-328 is fixed for that particular instance. It is not necessary for the origin point or the ultimate destination point of the dynamic objects 306-328 be known or identified.

B. Topological Analysis Stage

The topological analysis processes described below are performed by, coordinated by, and/or facilitated by the topological module 116 of the processor 104. The topological module 116 may additionally utilize other components of the operating environment 100, including the mobile programmable agent 122, the agent systems 128, and/or the agent sensors 130.

Figure 4:
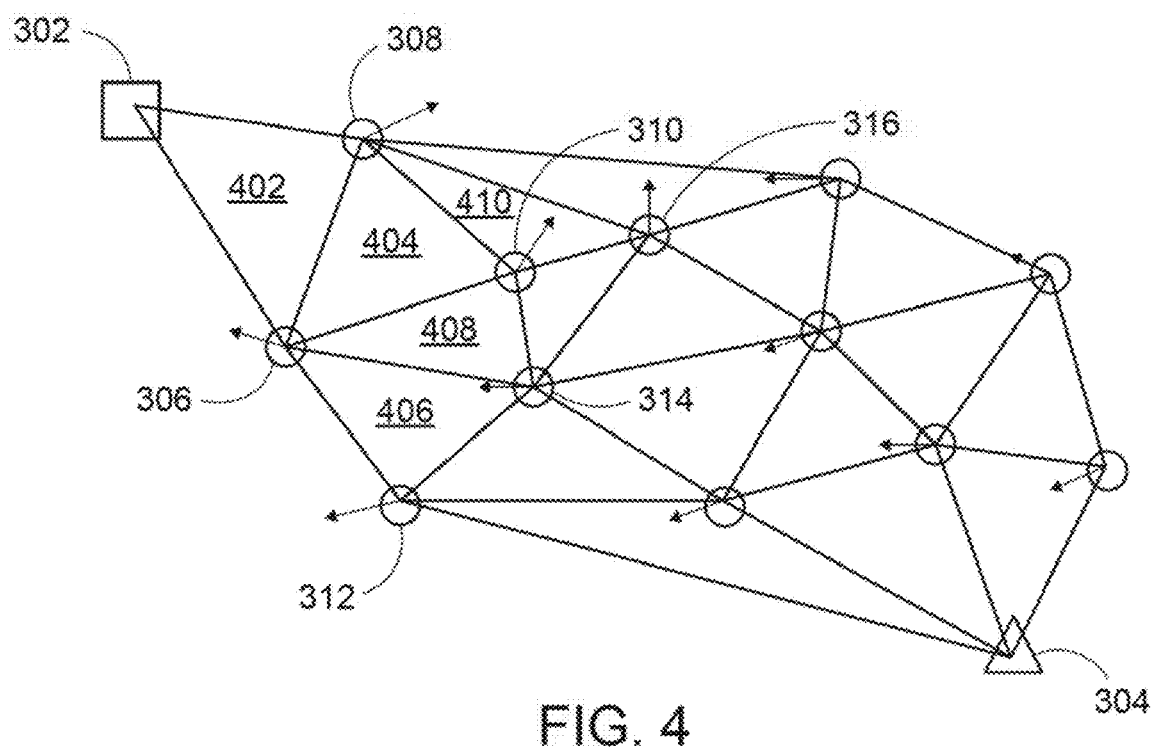
FIG. 4 is a schematic diagram of the physical environment divided into a plurality of plane figures according to one or more embodiments.

Returning to FIG. 2, at block 206, the topological analysis stage includes the topological module 116 virtually dividing the physical environment 300 into a plurality of plane figures. A plane figure is a closed geometric shape that connects three or more of the origin 302, the destination 304, and/or the dynamic objects 306-328. For example, as shown in FIG. 4, the origin 302, the first dynamic object 306, and the second dynamic object 308 form a first plane figure 402. Rays of the plane figures extend between two or more of the origin 302, the destination 304, and/or the dynamic objects 306-328. Two rays form an angle such that the two rays share a common endpoint that is a vertex. Vertexes of the angles of the plane figures overlay the origin 302, the destination 304, and/or the dynamic objects 306-328. Because the plane figures are closed, the rays that form the plane figures form an outline of the plane figures that enclose an area of the plane figure.

Plane figures may share rays and vertexes with other plane figures in the physical environment 300. For example, a second plane figure 404 is formed between the first dynamic object 306, the second dynamic object 308, and the third dynamic object 310. Accordingly, the ray extending between the first dynamic object 306 and the second dynamic object 308 is shared by the first plane figure 402 and the second plane figure 404.

Furthermore, a third plane figure 406 is formed between the first dynamic object 306, the fourth dynamic object 312, and the fifth dynamic object 314. A fourth plane figure 408 is formed between the first dynamic object 306, the third dynamic object 310, and the fifth dynamic object 314. A fifth plane figure 410 is formed between the first the second dynamic object 308, the third dynamic object 310, and the sixth dynamic object 316, and so on for the remaining dynamic objects of the virtually divided physical environment 300.

Here, the plane figures are each depicted as triangles, however the physical environment 300 may be divided into a variety of shapes including, but not limited to, quadrilateral, kite, parallelogram, rhombus, lozenge, rhomboid, rectangle, square, trapezius, trapezoid, pentagon, hexagon, heptagon, octagon, nonagon, decagon, hendecagon, etc. In some embodiments, the shape of plane figures may be based on the geometric operation used to virtually divide the physical environment 300. For example, suppose that the topological module 116 uses triangulations, such as a Delaunay triangulation, then the resulting plane figures are triangles. In another embodiment, a variety of shapes may be used to virtually divided the physical environment 300.

Figure 5:
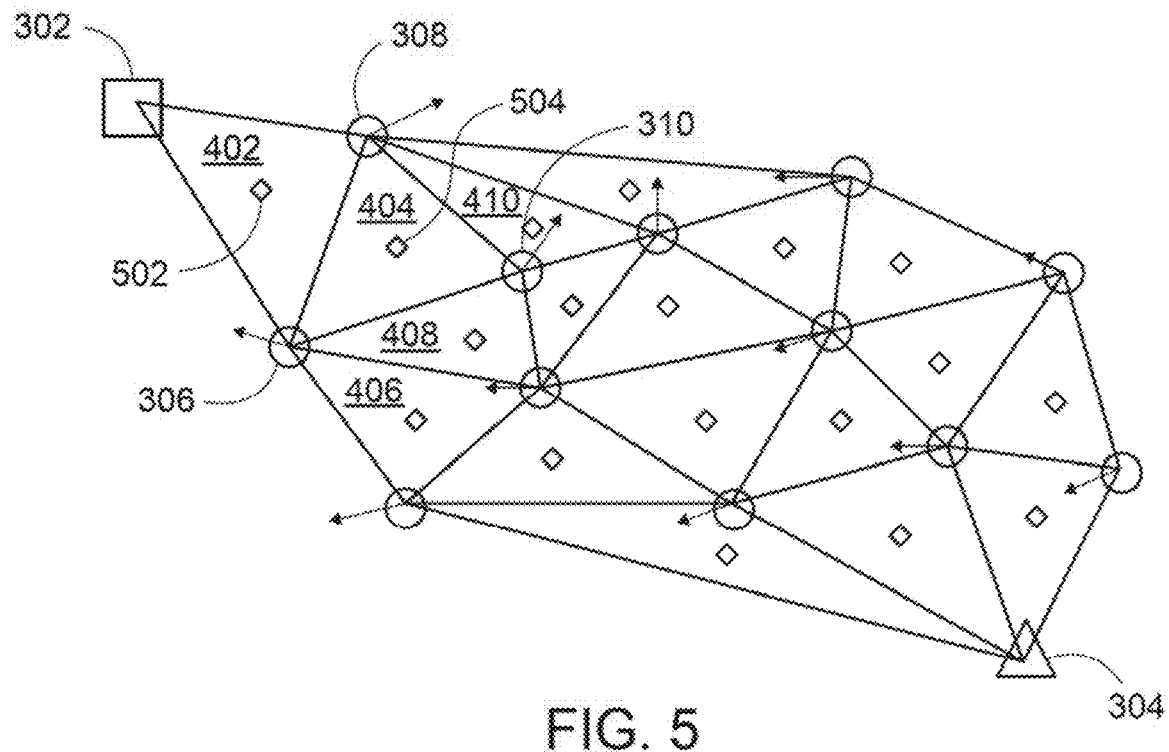
FIG. 5 is a schematic diagram of the plane figures of the physical environment having centroids according to one or more embodiments.

Returning to the method 200, at block 208, the topological analysis stage includes calculating a location of a centroid in the area of each plane figure. As shown in FIG. 5, a centroid may be calculated for each of the plane figures. For example, the first plane figure 402 has a first centroid 502, the second plane figure 404 has a second centroid 504, the third plane figure 406 has a third centroid 506, the fourth plane figure 408 has a fourth centroid 508, and the fifth plane figure 410 has a fifth centroid 510. In a similar manner, centroids are calculated for the remaining plane figures of the virtually divided physical environment 300.

The centroid is the center of mass of the plane figure. Here, because the plane figures are depicted as triangles, the centroid is the point that maximizes the product of the directed distances of a point from the triangle's rays. Other shapes of plane figures may have alternative definitions and/or methods for calculating the centroid based on the shape of the plane figure. Example operations for calculating centroids may include, but are not limited to, the plumb line method, balancing method, geometric decomposition, and median calculation, among others.

Figure 6:
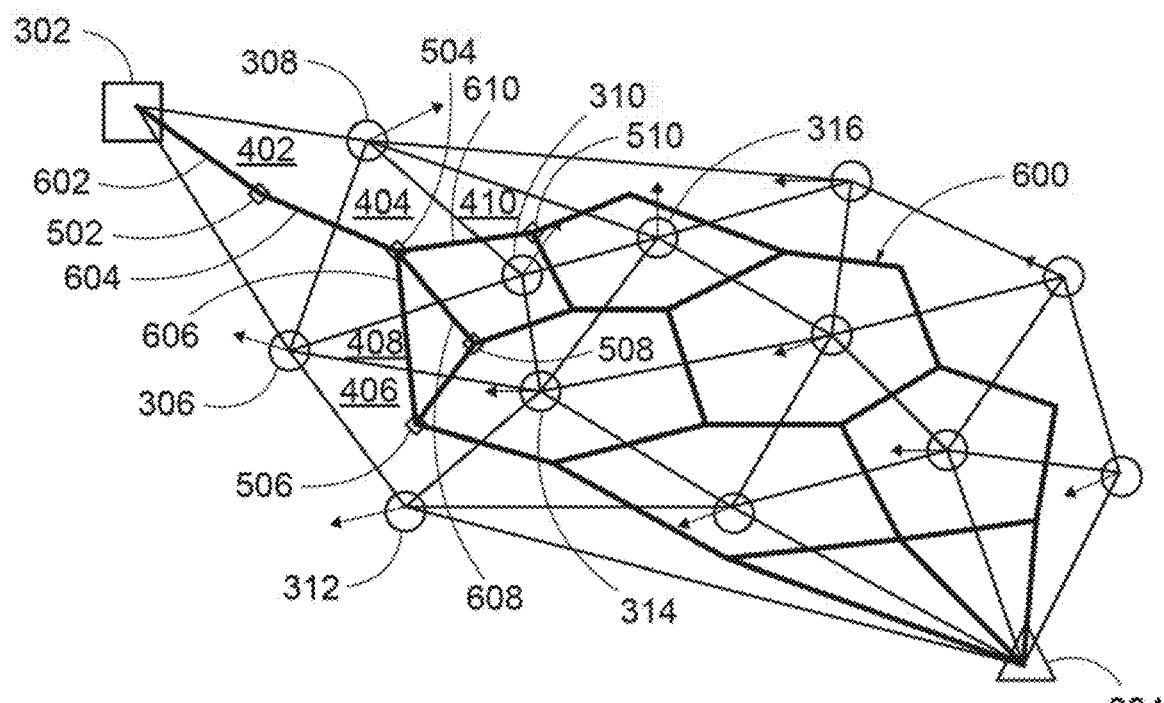
FIG. 6 is a schematic diagram of a network of segments from the origin to the destination intersecting the centroids according to one or more embodiments.

Returning to the method 200, at block 210, the topological analysis stage includes forming a network of segments 600, shown in FIG. 6. The network of segments 600 is formed by the topological module 116 from segments that extend from the origin 302 to the destination 304 through the centroids of the plane figures. For example, a first segment 602 extends from the origin 302 to the first centroid 502 and a second segment 604 extends from the first centroid 502 to the second centroid 504. A third segment 606, a fourth segment 608, and a fifth segment 610 extend from the second centroid 504. For example, the third segment extends between the second centroid 504 and the third centroid 506, the fourth segment extends between the second centroid 504 and the fourth centroid 508, and the fifth segment extends between the second centroid 504 and the fifth centroid 510.

The topological module 116 may classify the segments of the network of segments based on geometric features of the virtually divided physical environment 300. For example, the topological module 116 may classify the segments based on the number of rays of the plane figures that the segments intersect. In one embodiment, zeroth-order segments may not intersect any rays of the plane figures. For example, here, the first segment 602 is a zeroth-order segment. First order segments may intersect a single ray. For example, the second segment 604, the fourth segment 608, and the fifth segment 610 are first-order segments. Second-order segments intersect two rays. For example, the third segment 606 is a second-order segment.

The topological module 116 may form the network of segments 600 by applying classification rules to individual segments to determine whether the individual segments should be included in the network of segments 600. For example, the classification rules may not allow the network of segments 600 to include third-order segments. Accordingly, the network of segments 600 may not extend over the entirety of the physical environment 300. In some embodiments, the classification rules may be based on the operations used to form the network of segments 600, such as a modified A* search.

Figure 7:
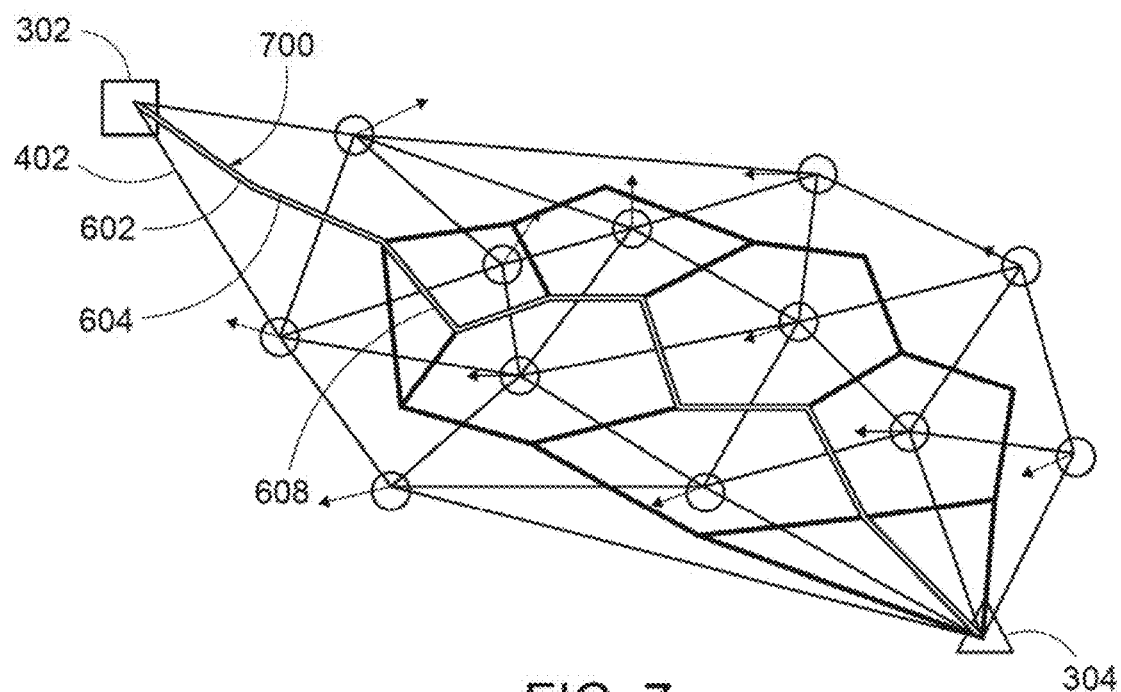
FIG. 7 is a schematic diagram of a channel through the physical environment along a set of segments according to one or more embodiments.

Returning to the method 200, at block 212, the topological analysis stage includes determining a channel 700, shown in FIG. 7, from the origin 302 to the destination 304 using a set of segments of the network of segments 600. For example, the channel 700 may extend from the origin 302 to the first segment 602, the second segment 604, the fourth segment 608, and so on to the destination 304. Although a single channel is shown for clarity, a number of channels may be determined from the origin 302 to the destination 304.

A number of operations may be used to determine the path of the channel 700 using the segments virtually formed for the physical environment 300. For example, as discussed above, a modified A* search may be used to determine the path of the channel 700. Additionally or alternatively, the segments of the channel 700 may be selected using the classification of segments. For example, the classification orders may be tiered in order of preference. In one embodiment, first-order segments may be preferred over second-order segments, and zeroth-order segments may be preferred over first-order segments. Accordingly, the topological module 116 may start at the origin and select segments according to the order of the segments to determine the channel 700 to the destination 304.

The topological module 116 may determine the location of the channel 700 may also be made based on one or more social logic rules. The social logic rules may be stored on-board the mobile programmable agent 122, at for example, the agent memory 126 or the computing device 102, at for example, the device memory 106. In another embodiment, the social logic rules may be accessed at the naturalistic behavior database 136. The topological module 116 may compare candidate channels to the one or more social logic rules to selectively determine the channel 700.

Figure 8:
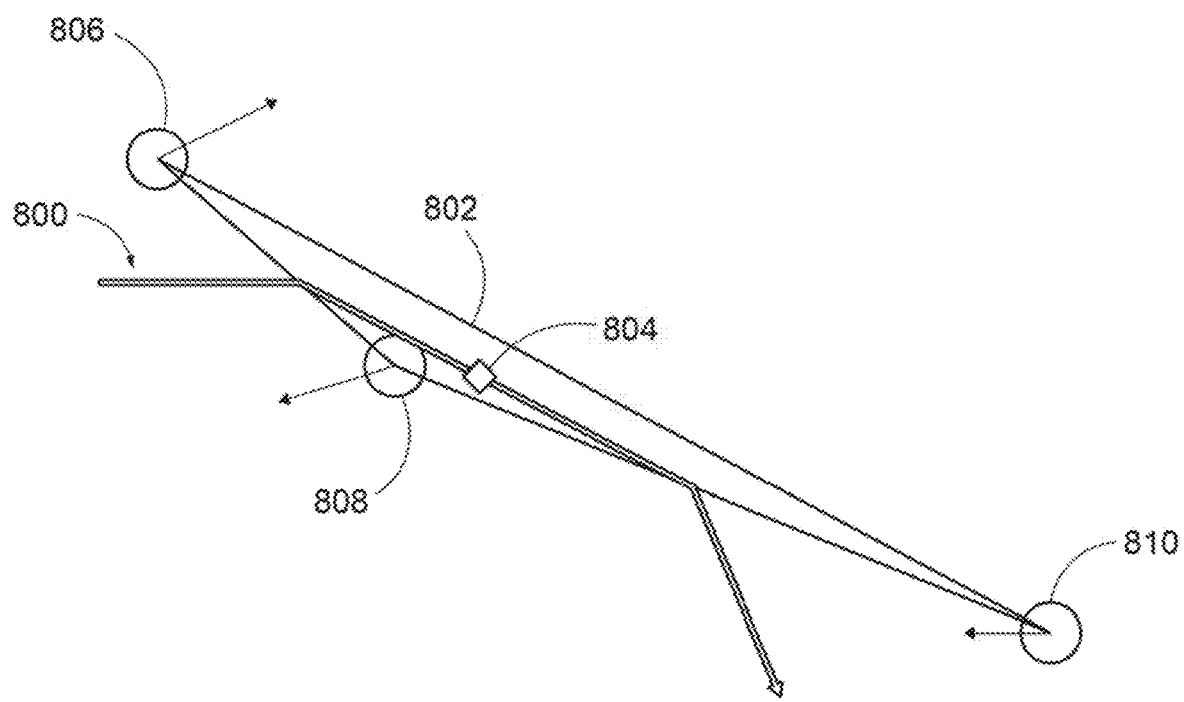
FIG. 8 is a schematic diagram of a candidate channel according to one or more embodiments.

Turning to FIG. 8, suppose that a candidate channel 800 moves through a plane figure 802 and intersects a centroid 804. The plane figure 802 is formed between dynamic objects 806, 808, and 810 that represent humans populating the area of a physical environment represented by the plane figure 802. A social logic rule may dictate that a candidate channel 800 not pass within a predetermined radius of a dynamic object so as to afford the human adequate personal space. Suppose that the proximity of the candidate channel 800 to the dynamic object 808 causes the candidate channel 800 to pass within the predetermined radius. Then the topological module 116 may discard the candidate channel 800 for a channel that comports with the social logic rules. In this manner, the topological module 116 models the physical environment 300 into a topological infrastructure of discrete measurements that can be used for navigational planning.

C. Gate Stage

The gate determination processes described below are performed by, coordinated by, and/or facilitated by the gate module 118 of the processor 104. The gate module 118 may additionally utilize other components of the operating environment 100, including the mobile programmable agent 122, the agent systems 128, and/or the agent sensors 130.

Figure 9:
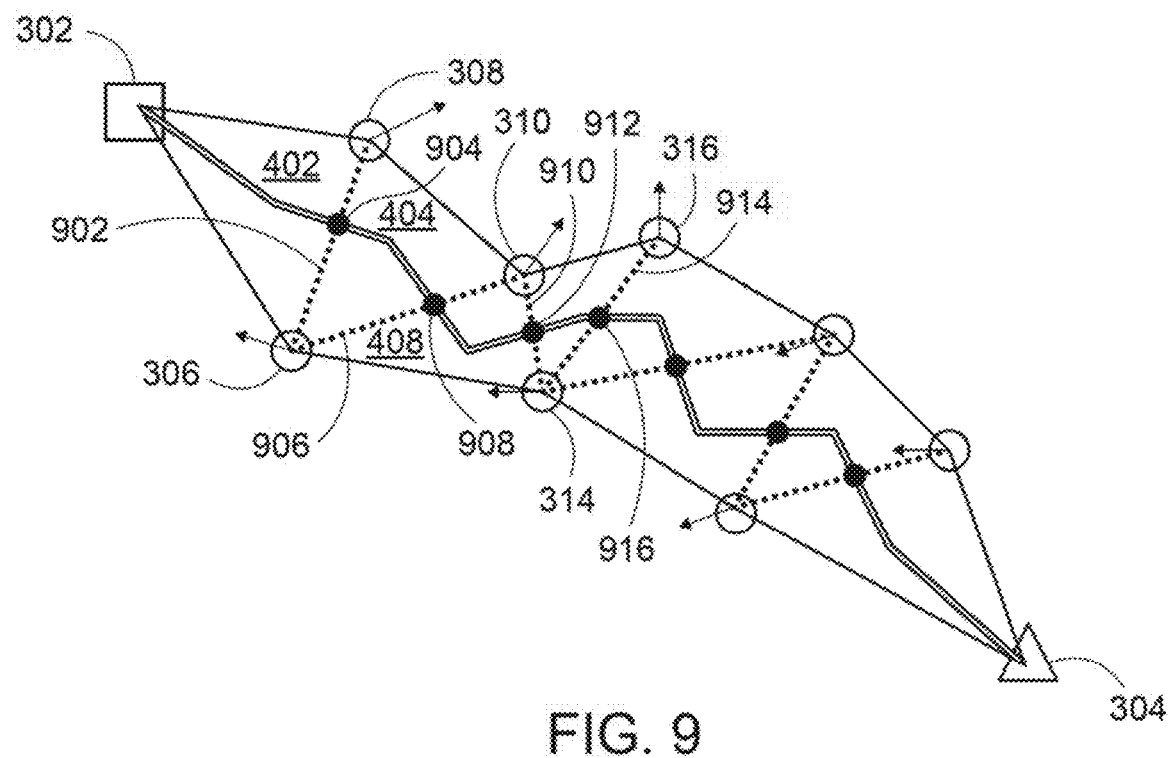
FIG. 9 is a schematic diagram of a set of gates that cross the channel according to one or more embodiments.

Returning to FIG. 2, at block 214 the gate stage includes identifying a set of gates, shown in FIG. 9, along the channel 700. The gate module 118 uses the topological infrastructure modeled by the topological module 116. For example, a gate extends from one dynamic object to another dynamic object along a ray of the outline of a plane figure. Here, a first gate 902 extends along the ray between the first dynamic object 306 and the second dynamic object 308. The channel 700 intersects the first gate 902 at a first node 904. Likewise, a second gate 906 extends along the ray between the first dynamic object 306 and the third dynamic object 310. The channel 700 intersects the second gate 906 at a second node 908. A third gate 910 extends along the ray between the third dynamic object 310 and the fifth dynamic object 314. The channel 700 intersects the third gate 910 at a third node 912. A fourth gate 914 extends along the ray between the fifth dynamic object 314 and the sixth dynamic objects 316. The channel 700 intersects the fourth gate 914 at a fourth node 916. In the manner, the channel 700 is bisected by a set of gates arranged between dynamic objects 306-328 that may be moving in the physical environment 300.

Returning to the method 200, at block 216, the gate stage includes the gate module 118 selectively determining a state of the gates of the set of gates based on movement of one or more of the dynamic objects. As discussed above, the dynamic objects 306-328 capable of self-propelled movement. The state of the gates is used to measure the accessibility of the channel 700 in time by determining the relative distance between the dynamic objects 306-328 due to the movement, if any, of the dynamic objects 306-328. In this manner, the gate module 118 monitors the dynamic nature of the channel 700 as the dynamic objects 306-328 move through the physical environment 300.

The state of the gates is indicative of the size of the channel at the corresponding node. Accordingly, the state of the gate is based on the distance between the dynamic objects situated at the endpoints of the gate. The state of the gates may be selected from static, opening, closing, or closed. For example, if the dynamic objects at the endpoints of the gate are maintaining their relative distance to one another because, for example, the dynamic objects are substantially stationary, the state may be determined to be static. If the dynamic objects are moving farther apart such that the channel 700 is becoming wider at the corresponding node, then the gate is opening. If the dynamic objects are moving closer together such that the channel 700 is becoming narrower at the corresponding node, then the gate is closing. If at the node corresponding to a gate, the channel 700 is impassable, the gate is closed. Therefore, determining the state of the gates may be based on sensor data measuring the relative distance between the dynamic objects 306-328. The sensor data may be harvested from the agent systems 128 and the agent sensors 130 of the mobile programmable agent 122.

In addition to the relative distance between the dynamic objects, the state of the gates may be based on one or more social logic rules. As discussed above, the social logic rules may be stored on-board the mobile programmable agent 122, at for example, the agent memory 126, at the computing device 102, at for example, the device memory 106, or at the naturalistic behavior database 136. The social logic rules codify social conventions for traversing the physical environment 300. For example, a social logic rule may define an amount of personal space for the dynamic objects 306-328 as a boundary around a dynamic object. A social logic rule may include defining a passing side for the mobile programmable agent 122. For example, some cultures may typically pass on the left while others typically pass on the right. As another example, while there may room for the mobile programmable agent 122 to pass in front of a dynamic object, a social logic rule may dictate that the mobile programmable agent 122 pass behind the dynamic object. A social logic rule may also facilitate identifying that two or more dynamic objects are cooperating (e.g., in conversation, taking photographs, lifting an object, holding hands, embracing, etc.).

The social logic rules act as a factor in the determination of the state of the gates. Suppose that the third dynamic object 310 and the fifth dynamic object 314 are conversing, and thus, are in cooperation. A social logic rule may dictate that the mobile programmable agent 122 cannot pass between the third dynamic object 310 and the fifth dynamic object 314 because the third dynamic object 310 and the fifth dynamic object 314 are in cooperation. Because the mobile programmable agent 122 cannot pass between the third dynamic object 310 and the fifth dynamic object 314, the gate module 118 may determine that the third gate 910 is closed. Accordingly, a gate may be closed even though the gate is wide enough for the mobile programmable agent 122 to pass due to the one or more social logic rules.

The one or more social logic rules may also change the way that distance is measured between the dynamic objects 306-328 to affect the determination of the state of the gates. Suppose that a social logic rule defines a one-meter radial boundary around the dynamic object 306-328 to afford the dynamic objects 306-328 with adequate personal space. Further suppose that that the distance between the first dynamic object 306 and the second dynamic object 308 is three meters. The width of the channel 700 at the first node 904 may be one meter due to each of the first dynamic object 306 and the second dynamic object 308 having a one-meter radial boundary. Therefore, even if the of the first dynamic object 306 and the second dynamic object 308 are only tangentially approaching with a three-meter gap between them, the first gate 902 may be deemed to be closing.

Moreover, a social logic rule may prescribe that the mobile programmable agent 122 be prescribed a radial boundary, for example, for safety. Continuing the scenario detailed above, suppose a social logic rule prescribes a one-meter radial boundary for the dynamic objects 306-328 and the distance between the first dynamic object 306 and the second dynamic object 308 is three meters. If the mobile programmable agent 122 has greater than a one-meter radial boundary, then the first gate may be deemed to be closed even if the relative distance between the first dynamic object 306 and the second dynamic object 308 is static. Conversely, if the distance between the first dynamic object 306 and the second dynamic object 308 is growing, the first gate 902 may be deemed to be opening. In this manner, the one or more social logic rules can impose a safety threshold that is based on the length of the gate. For example, one or more social logic rules may identify a predetermined length of the gates Continuing the scenario from above, if instead, the distance between the first dynamic object 306 and the second dynamic object 308 is two meters, then the width of the channel 700 at the first node 904 may be null. The null width may cause the first gate 902 to be deemed closed because a collision between the mobile programmable agent 122 and a dynamic object is predicted to occur. In this manner, the one or more social logic rules be an additional factor in selectively determining a state of the gates of the set of gates based on movement of one or more of the dynamic objects with respect to the mobile programmable agent 122.

The one or more social logic rules may be tiered and or categorized. For example, social logic rules concerning safety may be considered before social logic rules concerning social conventions. For example, suppose that a first social logic rule sets a one-meter radial boundary around the mobile programmable agent 122, and a second social logic rule prescribes passing on the right. The first social logic rule may be categorized as a safety rule intended to protect the dynamic objects 306-328 from the mobile programmable agent 122. The second social logic rule may be a social convention intended to cause the mobile programmable agent to culturally conform in the physical environment 300. The social logic rules may be tiered so that the safety rules govern when competing with social conventions. Accordingly, if passing through one gate would cause the first social logic rule to be violated, then that gate would be determined to be closed and another gate might be determined to be open, even if the mobile programmable agent 122 using that gate would violate the second rule. In this manner, the social logic rules are factors in determining a state of the gates of the set of gates based on movement of one or more of the dynamic objects. Moreover, those factors can be weighted based on the importance and/or priority of the social logic rule according to a tiered system, categorization, etc.

In some embodiments, the one or more social logic rules may be based on sensor data of the physical environment 300. For example, if the dynamic objects 306-328 are observed to be statistically more likely to pass on the right, then a social logic rule may be instituted so that the mobile programmable agent 122 will also pass on the right. Therefore, the one or more social logic rules can evolve such that the mobile programmable agent 122 is able to adapt to the physical environment 300.

D. Pathway Assessment Stage

The pathway assessment processes described below are performed by, coordinated by, and/or facilitated by the pathway module 120 of the processor 104. The pathway module 120 may additionally utilize other components of the operating environment 100, including the mobile programmable agent 122, the agent systems 128, and/or the agent sensors 130.

Figure 10:
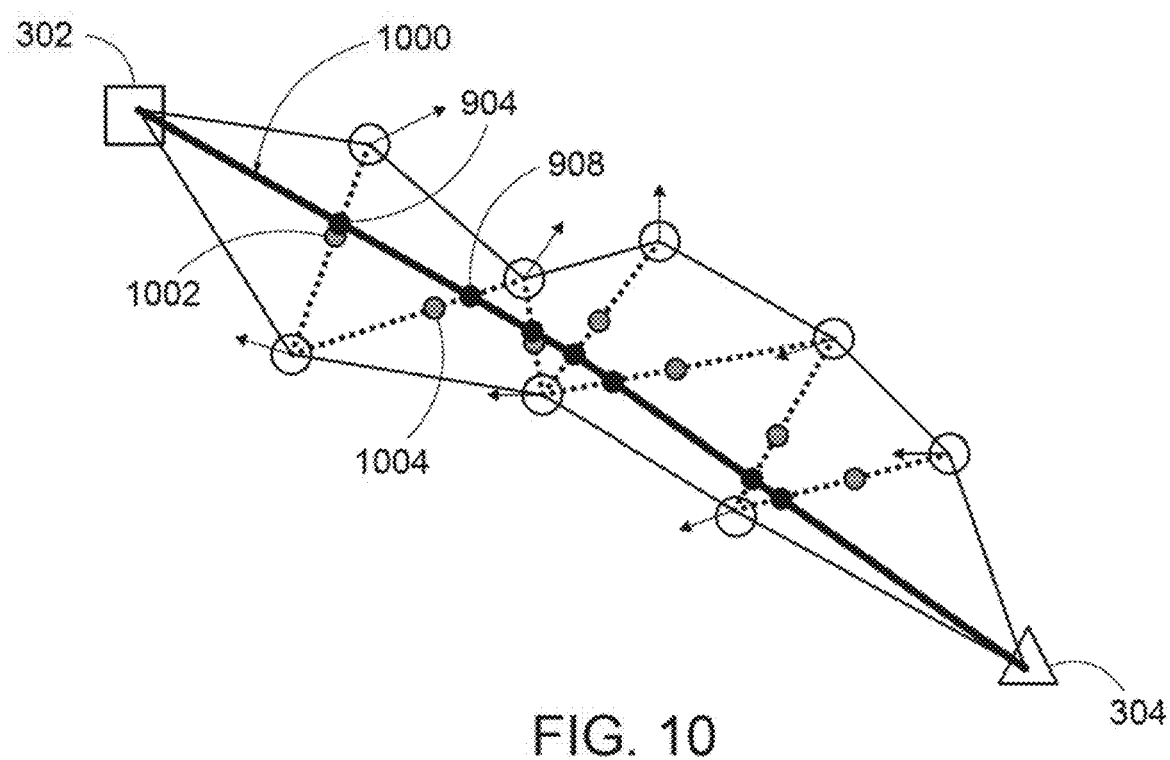
FIG. 10 is a schematic diagram of a refined pathway through the channel according to one or more embodiments.

Returning to FIG. 2, at block 218 the pathway assessment stage includes the pathway module 120 identifying a pathway 1000, as shown in FIG. 10, for the mobile programmable agent 122 to traverse the physical environment 300 from the origin 302 to the destination 304 through the channel 700 based on the determined state of the gates. For example, suppose that the gates on the channel are all opening, then the pathway 1000 may be defined within the channel 700. For example, as shown in FIG. 10 the pathway 1000 may pass through the nodes corresponding to the gates. For example, the pathway 1000 passes through the first node 904 and the second node 908.

In another embodiment, the pathway 1000 may be determined based on the width of the channel 700 at the nodes corresponding to the gates. Additionally, or alternatively, the pathway 1000 may be determined by reapplying the one or more social rules within the channel 700. For example, a social logic rule may indicate that the mobile programmable agent 122 travel in the rightmost area of the physical environment 300 when possible. Accordingly, the pathway 1000 in the channel 700 may tend rightward. Suppose the channel 700 is one-meter wide at the first node 904 and two-meters wide at the second node 908. The pathway 1000 may only slightly move right to a first shifted node 1002 corresponding to the width of the first gate 902 being narrower than the second gate 906. The pathway 1000 may move more rightward to the second shifted node 1004 corresponding to the larger width of the second gate 906. Using the social logic rules, the pathway 1000 may be identified based on an estimated time of arrival at the destination and a safety threshold, such as the width of a gate.

Returning to the method 200, at block 220, the pathway assessment stage includes refining the pathway 1000. For example, the channel 700 may be angular and cause the mobile programmable agent 122 to move in a stilted manner. Accordingly, geometric methods and/or other mathematical operations, such as funnel operation, may be applied to the pathway 1000 to act as a smoothing operation. For example, the geometric methods and/or the other mathematical operations may introduce a curvature to the pathway 1000 so that the pathway 1000 mimics a more natural footprint.

The systems and methods for navigational planning enable a mobile programmable agent 122 to navigate crowds. In particular, the gates allow the channel 700 to accommodate the dynamic objects 306-328 thereby improving the likelihood of the mobile programmable agent 122 successfully traversing the physical environment 300 while decreasing the computational burden of navigational planning. Moreover, the navigational planning can account for social logic rules such that the mobile programmable agent 122 appears to behave in a more natural manner and comports with social norms.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for navigational planning of a mobile programmable agent at an origin, the system comprising:
    a processing unit; and
    a memory, storing processor-executable instructions, which when executed by the processing unit, perform:
        identifying a destination for the mobile programmable agent;
        identifying a plurality of dynamic objects in a physical environment including the origin and the destination, wherein a dynamic object of the plurality of dynamic objects is capable of self-propelled movement;
        performing a geometric operation to divide the physical environment into a plurality of plane figures, wherein each plane figure has an outline and an area, and wherein each plane figure has at least three angles corresponding to one or more of the origin, the destination, and a dynamic object of the plurality of dynamic objects;
        calculating a location of a centroid in an area of each plane figure;
        forming a network of segments from the origin to the destination intersecting the centroids,
        determining at least one channel from the origin to the destination using a set of segments from the network of segments;
        identifying a set of gates along the at least one channel, wherein a gate of the set of gates extends from one dynamic object to an other dynamic object along an outline of a plane figure that connects the one dynamic object to the other dynamic object;
        selectively determining a state of the gates of the set of gates based on movement of the one dynamic object relative to the other dynamic object, wherein the state is selected from static, opening, closing, or closed; and
        identifying a pathway for the mobile programmable agent to traverse from the origin to the destination based on the determined state of the gates.

2. The system for navigational planning of claim 1, wherein determining the state of the gates is also based on one or more social logic rules.

3. The system for navigational planning of claim 2, wherein a social logic rule of the one or more social logic rules includes an amount of personal space defined as a radial boundary around a dynamic object.

4. The system for navigational planning of claim 2, wherein a social logic rule of the one or more social logic rules includes a passing side for the mobile programmable agent to pass a dynamic object.

5. The system for navigational planning of claim 2, wherein a social logic rule of the one or more social logic rules includes identifying two or more dynamic objects are cooperating.

6. The system for navigational planning of claim 5, wherein a gate extending between cooperating objects is determined to be closed.

7. The system for navigational planning of claim 1, wherein the system for navigational planning iteratively performs determining the state of the gates.

8. The system for navigational planning of claim 1, wherein determining the state of the gates is based on sensor data from agent systems or agent sensors of the mobile programmable agent.

9. The system for navigational planning of claim 1, wherein identifying a pathway is further based on an estimated time of arrival at the destination and a safety threshold.

10. The system for navigational planning of claim 9, wherein the safety threshold is based on a length of the gates.

11. A method for navigational planning for a mobile programmable agent at an origin, the method comprising:
    identifying a destination for the mobile programmable agent;
    identifying a plurality of dynamic objects in a physical environment including the origin and the destination, wherein a dynamic object of the plurality of dynamic objects is capable of self-propelled movement;
    performing a geometric operation to divide the physical environment into a plurality of plane figures, wherein each plane figure has an outline and an area, and wherein each plane figure has at least three angles corresponding to one or more of the origin, the destination, and a dynamic object of the plurality of dynamic objects;

calculating a location of a centroid in an area of each plane figure;

forming a network of segments from the origin to the destination intersecting the centroids, determining a channel from the origin to the destination using a set of segments from the network of segments;

identifying a set of gates along the channel, wherein gates of the set of gates have lengths extending from one dynamic object to an other dynamic object along an outline of a plane figure that connects the one dynamic object to the other dynamic object;

selectively determining a state of the gates of the set of gates based on movement of the one dynamic object relative to the other dynamic object, wherein the state is selected from static, opening, closing, or closed; and identifying a pathway within the channel for the mobile programmable agent to traverse from the origin to the destination based on the determined state of the gates.

12. The method for navigational planning of claim 11, wherein a gate being determined to be closing or closed is predictive of a collision between the mobile programmable agent and at least one dynamic object.

13. The method for navigational planning of claim 11, wherein the channel has a width corresponding to the lengths of the gates that intersect the channel.

14. The method for navigational planning of claim 11, further comprising performing a smoothing operation to refine the pathway within the channel.

15. A non-transitory computer-readable storage medium storing instructions that, when executed by a computer, causes the computer to perform a method for navigational planning comprising:

identifying a destination for a mobile programmable agent at an origin;

identifying a plurality of dynamic objects in a physical environment including the origin and the destination, wherein a dynamic object of the plurality of dynamic objects is capable of self-propelled movement;

performing a geometric operation to divide the physical environment into a plurality of plane figures, wherein each plane figure has an outline and an area, and wherein each plane figure has at least three angles corresponding to one or more of the origin, the destination, and a dynamic object of the plurality of dynamic objects;

calculating centroids in areas of each plane figure;

forming a network of segments from the origin to the destination intersecting the centroids, determining a channel from the origin to the destination using a set of segments from the network of segments;

identifying a set of gates along the channel, wherein a gate of the set of gates extends from one dynamic object to an other dynamic object along an outline of a plane figure that connects the one dynamic object to the other dynamic object;

selectively determining a state of the gates of the set of gates based on movement of the one dynamic object relative to the other dynamic object, wherein the state is selected from static, opening, closing, or closed; and identifying a pathway for the mobile programmable agent to traverse from the origin to the destination based on the determined state of the gates.

16. The non-transitory computer-readable storage medium of claim 15, wherein the gates have nodes, and wherein the pathway intersects the nodes.

17. The non-transitory computer-readable storage medium of claim 15, wherein due to one or more social logic rules, a gate may be closed even though the gate is wide enough for the mobile programmable agent to pass.

18. The non-transitory computer-readable storage medium of claim 15, wherein the gates are categorized and tiered based on safety rules and social conventions.

19. The non-transitory computer-readable storage medium of claim 18, wherein the safety rules govern when competing with the social conventions.

20. The non-transitory computer-readable storage medium of claim 15, further comprising refining the pathway.

* * * * *